(12) United States Patent
Weng et al.

(10) Patent No.: US 11,762,930 B2
(45) Date of Patent: Sep. 19, 2023

(54) SYSTEM, METHOD AND STORAGE MEDIUM FOR PROVIDING INFORMATION

(71) Applicant: COMPAL ELECTRONICS, INC., Taipei (TW)

(72) Inventors: Hao-Chen Weng, Taipei (TW); Chiao-Tsu Chiang, Taipei (TW); Chieh-Yu Chan, Taipei (TW); Ya-Fang Hsu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 97 days.

(21) Appl. No.: 17/016,417

(22) Filed: Sep. 10, 2020

(65) Prior Publication Data

US 2021/0103627 A1 Apr. 8, 2021

Related U.S. Application Data

(60) Provisional application No. 62/911,190, filed on Oct. 4, 2019.

(51) Int. Cl.
| | |
|---|---|
| G06F 16/9536 | (2019.01) |
| G06F 16/9538 | (2019.01) |
| G06F 3/0482 | (2013.01) |
| G06N 5/04 | (2023.01) |
| G06V 20/20 | (2022.01) |
| G06F 18/25 | (2023.01) |
| G06V 20/70 | (2022.01) |
| G06V 20/10 | (2022.01) |
| G06V 40/10 | (2022.01) |

(52) U.S. Cl.
CPC ........ *G06F 16/9536* (2019.01); *G06F 3/0482* (2013.01); *G06F 16/9538* (2019.01); *G06F 18/256* (2023.01); *G06N 5/04* (2013.01); *G06V 20/10* (2022.01); *G06V 20/20* (2022.01); *G06V 20/70* (2022.01); *G06V 40/10* (2022.01)

(58) Field of Classification Search
CPC .................................................. G06F 11/0751
See application file for complete search history.

(56) References Cited

U.S. PATENT DOCUMENTS

| | | | | |
|---|---|---|---|---|
| 5,507,291 | A * | 4/1996 | Stirbl | A61B 8/00 600/407 |
| 10,275,670 | B1 * | 4/2019 | Li | G06V 20/593 |
| 2017/0249306 | A1 * | 8/2017 | Allen | G06F 16/438 |
| 2017/0372189 | A1 * | 12/2017 | Joo | B60W 50/0098 |
| 2018/0344242 | A1 * | 12/2018 | Ben-Kiki | A61B 5/7425 |
| 2019/0227822 | A1 * | 7/2019 | Azmoon | G06F 40/186 |
| 2020/0007672 | A1 * | 1/2020 | Reyes | H04M 1/6066 |

* cited by examiner

*Primary Examiner* — Di Xiao

(57) ABSTRACT

This application discloses a system for providing information related to an observed entity to a user. The system includes an information database, a score database, an inference engine and an information providing module. The information database has a plurality of messages stored therein and the messages are related to the observed entity. The score database has a plurality of scores recorded thereinto, and the scores are corresponding to the messages and are input by the user. The inference engine retrieves at least one selected message from the messages stored in the information database according to at least one source data and the score database and generates a list of the selected message. The information providing module provides the selected message to the user according to the list.

21 Claims, 5 Drawing Sheets

SYSTEM, METHOD AND STORAGE MEDIUM FOR PROVIDING INFORMATION

CROSS-REFERENCE TO RELATED APPLICATION

This non-provisional application claims priority under 35 U.S.C. § 119(e) on U.S. provisional Patent Application No(s). 62/911,190 filed on Oct. 4, 2019, the entire contents of which are hereby incorporated by reference.

BACKGROUND OF THE INVENTION

1. Field of the Invention

The present disclosure relates to an information providing system, and in particular to a system for providing information according to at least one source data and scores of the information by a user.

2. Description of the Related Art

It has long been a very important technical issue of how to use software and hardware technologies to efficiently provide useful information to a user of an electronic device. This issue is particularly important if the information needed by the user of the electronic device is related to an entity who needs care but is not able to collect and collate the information.

For instance, parents who raise an infant are usually very busy. A lot of information about infant care can be found on the Internet. However, for some particular situations, the parents have to take time to collect information and determine whether the information is useful or not. It is a heavy work for the parents to do so. The parents' burden in raising and caring an infant can be largely reduced if there is a system that can automatically collate and provide useful infant raising information to the parents.

BRIEF SUMMARY OF THE INVENTION

An objective of the present disclosure is to provide a system for providing information to a user while the information is related to an observed entity. The system includes an information database, a score database, an inference engine and an information providing module. The information database has a plurality of messages stored therein and the stored messages are related to the observed entity. The score database has a plurality of scores recorded thereinto and the scores are corresponding to the stored messages. The inference engine retrieves at least one selected message from the stored messages in the information database according to at least one source data and the score database and generates a list of the selected messages. The information providing module provides the selected messages to the user according to the list.

In an embodiment, the system further includes a score recording module for receiving scores given to the selected messages and input to the system by the user, and recording the received scores into the score database. In an embodiment, the inference engine retrieves the selected messages further according to a weight of the at least one source data. The source data includes at least one of basic data of the observed entity, recognition results of images of the observed entity, and recognition results of sounds from the observed entity. The source data can also include environmental data or a current time.

To achieve at least the above objective, the present disclosure also provides a method for providing information related to an observed entity to a user. The method includes the steps of retrieving, according to at least one source data and a score database, at least one selected message from a plurality of messages stored in an information database and generating a list of the selected messages; and providing the selected messages to the user according to the list. The stored messages are related to the observed entity.

To achieve at least the above objective, the present disclosure further provides an electronic device readable non-transient medium having a plurality of program instructions stored therein, and the program instructions are executable by an electronic device to perform the steps of retrieving, according to at least one source data and a score database, at least one selected message from a plurality of messages stored in an information database and generating a list of the selected messages; and providing the selected messages to the user according to the list. The stored messages are related to an observed entity.

DETAILED DESCRIPTION OF THE INVENTION

To facilitate understanding of the objects, characteristics and effects of this present disclosure, embodiments together with the attached drawings for the detailed description of the present disclosure are provided. It is noted the present disclosure can be implemented or applied in other embodiments, and many changes and modifications in the described embodiments can be carried out without departing from the spirit of the disclosure, and it is also understood that the preferred embodiments are only illustrative and not intended to limit the present disclosure in any way.

Figure 1A:
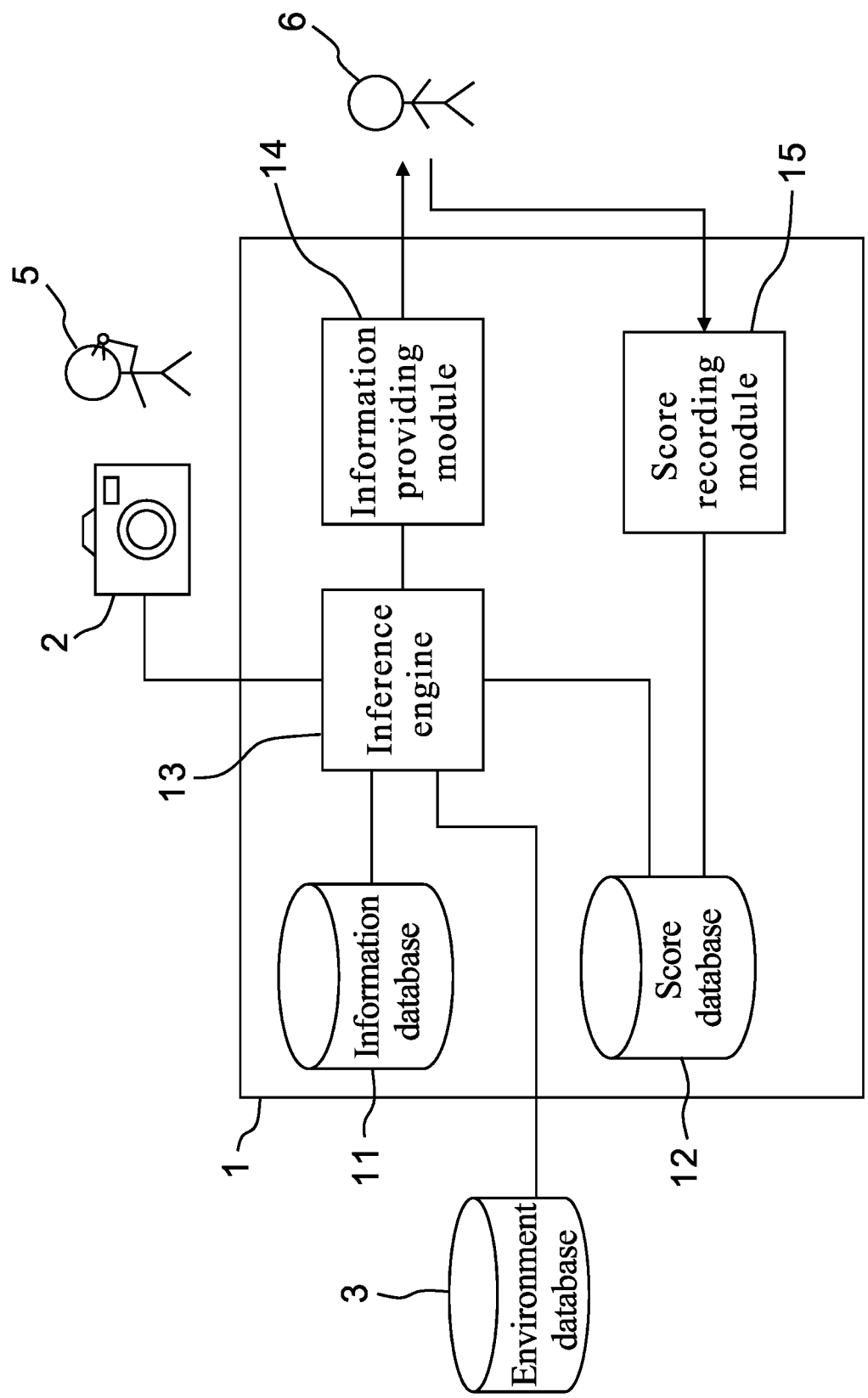
FIG. 1A is a block diagram showing the framework of a system according to an embodiment of the present disclosure.

Please refer to FIG. 1A, which shows a system 1 according to an embodiment of the present disclosure for providing information related to an observed entity 5 to a user 6. The observed entity 5 may be, for example, an infant or a toddler, an older person, or a person with a disability. The system 1 can be a hand-held electronic device, such as a cell phone or a tablet computer, which includes a processor, a display unit and a storage unit. The processor can be a main processor of the hand-held electronic device. The display unit can be a touch screen for displaying the information to the user 6. The user 6 can also input on the touch display unit. The storage unit can be an electronic device readable non-transient medium, such as a flash memory or other types of memories. A plurality of program instructions executable by the processor are stored in the storage unit.

After executing the program instructions, the processor can perform different steps corresponding to the program instructions. In another example, the system 1 may include a hand-held electronic device and a cloud server. A part of data and program modules of the system can be stored in the cloud server to save the storage space of the hand-held electronic device and shorten the running time of the hand-held electronic device.

The system 1 includes an information database 11, a score database 12, an inference engine 13, an information providing module 14, and a score recording module 15. In the embodiment shown in FIG. 1A, the information database 11 and the score database 12 are structural data stored in the storage unit and are synchronous with data in a cloud server. As to the inference engine 13, the information providing module 14 and the score recording module 15, they are program instructions stored in the storage unit and executable by the processor. The system 1 is signally connected with a camera 2 to receive images of the observed entity 5 captured by the camera 2. The system 1 can also be connected to an external environment database 3 to retrieve environmental data.

Figure 1B:
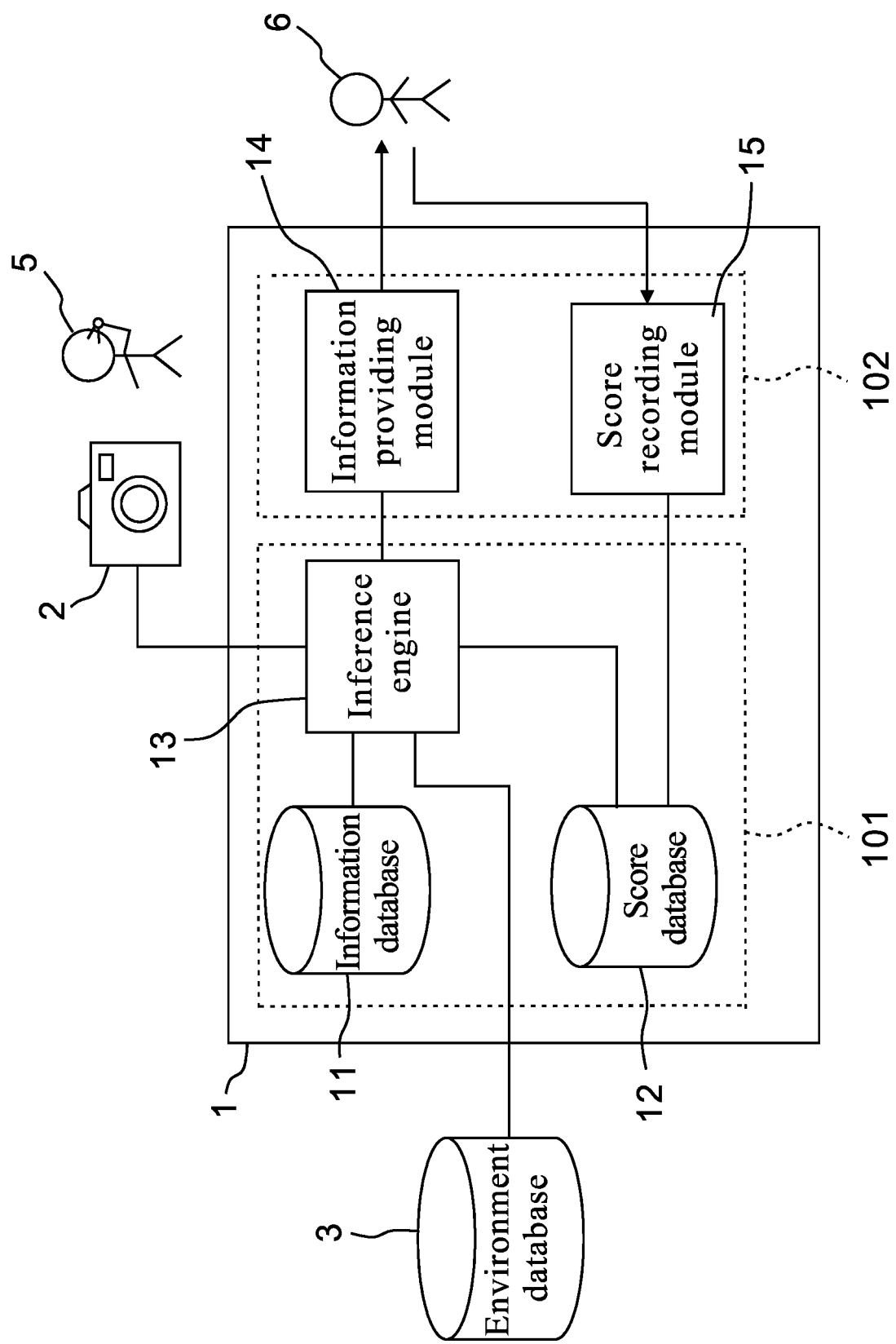
FIG. 1B is a block diagram showing the framework of a system according to another embodiment of the present disclosure.

Please refer to FIG. 1B. In another embodiment of the present disclosure, the system 1 includes a hand-held electronic device 102 and a cloud server 101. The aforesaid information database 11, score database 12 and inference engine 13 can be stored in the cloud server 101, while the aforesaid information providing module 14 and the score recording module 15 are stored in the hand-held electronic device 102. As to the inference engine 13, the information providing module 14 and the score recording module 15, they are program instructions stored in a storage unit of the cloud server 101 and executable by a processor module of the cloud server 101. The hand-held electronic device 102, the camera 2 and the external environment database 3 are connected to the cloud server 101 through the Internet. The hand-held electronic device 102 provides messages to the user 6 and receives scores input by the user 6 through the information providing module 14 and the score recording module 15, respectively. Since the cloud server allows a plurality of users to connect their hand-held electronic devices thereto, the scores recorded in the score database 12 can be an average of the scores from multiple users.

Figure 2:
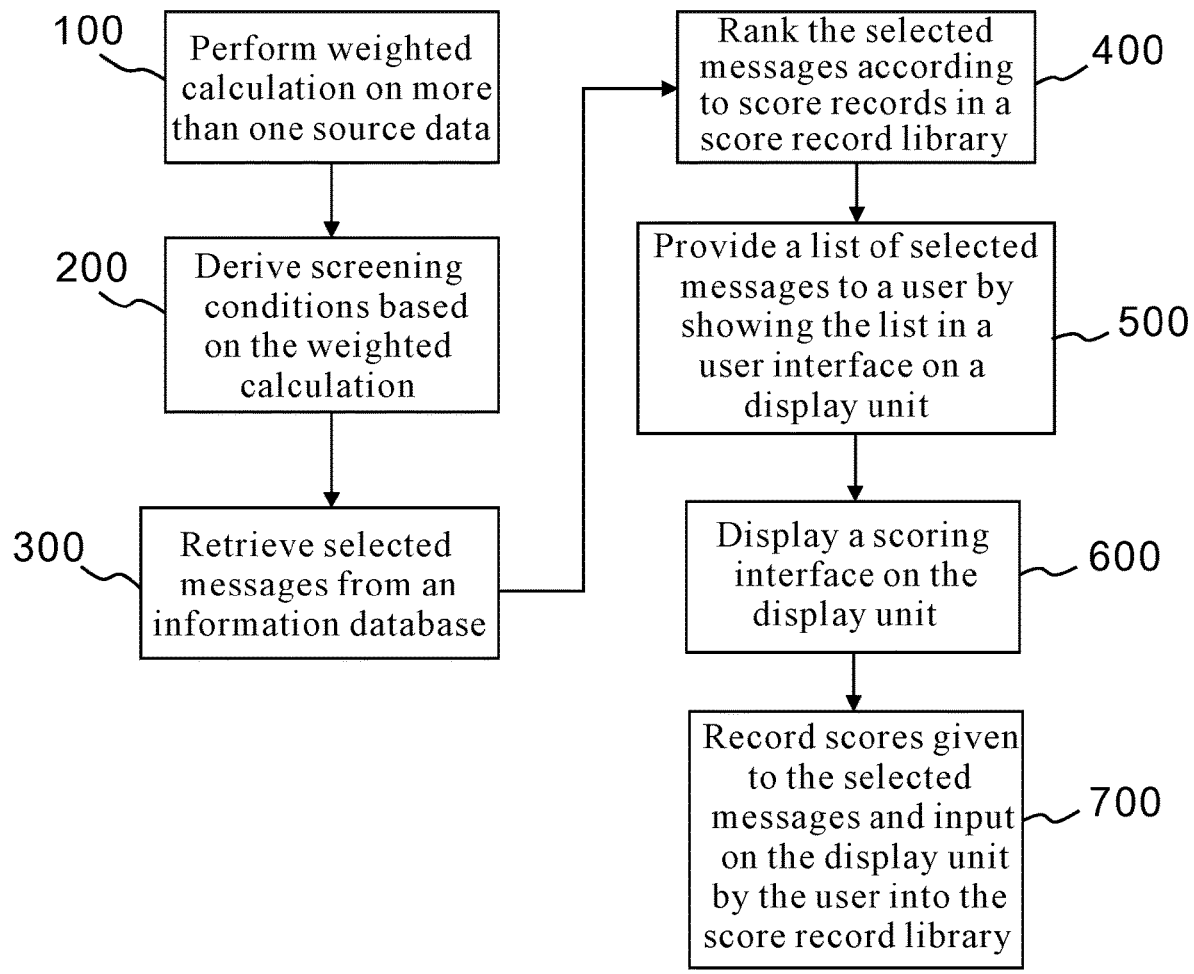
FIG. 2 is a flowchart showing the steps included in a method according to an embodiment of the present disclosure.

Please refer to FIG. 2 that is a flowchart showing the steps included in the method according to an embodiment of the present disclosure. In a step 100, the inference engine 13 performs weighted calculation on more than one source data. The source data can include the observed entity's basic data, recognition results of images of the observed entity 5 captured by the camera 2, recognition results of sounds from the observed entity 5, environmental data retrieved from the environment database 3, or a current time. For example, the inference engine 13 calculates the age of the observed entity 5 according to the birth date of the observed entity 5 and gives it a weight of $a(m)$; determines it is now in the autumn season according to the current time and gives it a weight of $b(n)$; determines the observed entity 5 is sucking finger according to a recognition result of an image of the observed entity 5 captured by the camera 2 and gives it a weight of $c(o)$; determines the observed entity 5 is crying according to a recognition result of a sound from the observed entity 5 and gives it a weight of $d(p)$; and determines the distributed areas and peak probability of a currently spreading disease according to the environment database 3 and gives it a weight of $e(q)$. The letters "a" to "e" are numeral parameters and "(m)" to "(q)" are function parameters.

Then, in a step 200, the inference engine 13 derives screening conditions based on the aforesaid weighted calculation. Thereafter, in a step 300, the inference engine 13 selects relevant messages from the information database 11. For example, after the calculation, the screening conditions, such as "one year old toddler", "autumn" and "flu", are derived, and the inference engine 13 selects from the information database 11 all messages that are related to these three screening conditions, which are referred to as "selected messages" herein. In another example, the screening conditions may be "two years old toddler" and "hunger". Then, the inference engine 13 selects from the information database all messages that are related to these two conditions to be the selected messages.

In a step 400, the inference engine 13 ranks the selected messages based on the scores recorded in the score database 12, in order to obtain a list that includes a predetermined number of selected messages. For example, after checking the scores recorded in the score database 12, three of 25 selected messages having higher scores than the others are selected to generate a list. Then, in a step 500, the information providing module 14 provides the list of selected messages to the user 6 by showing the provided messages in a user interface on the display unit.

Figure 3A:
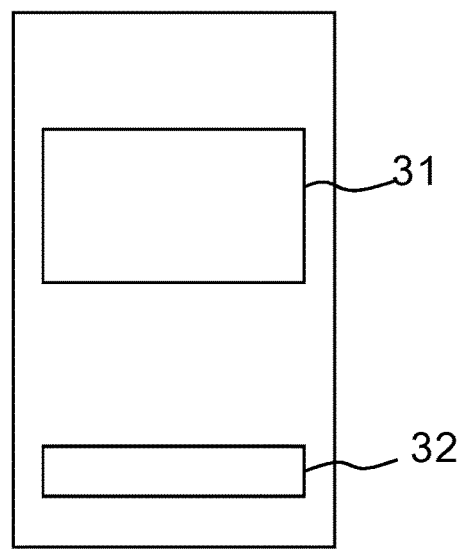
FIG. 3A is a schematic view showing a screen demonstrating the provided information and recorded score according to an embodiment of the present disclosure.
Figure 3B:
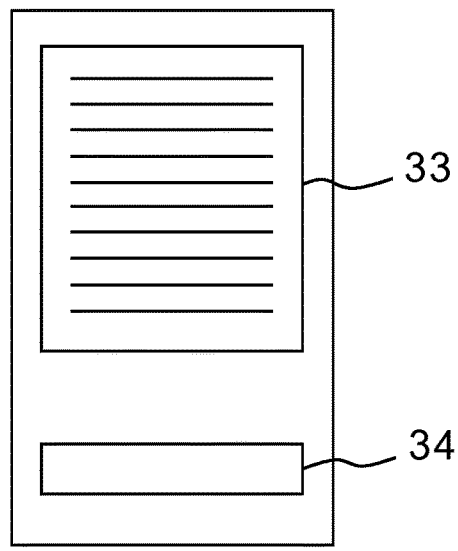
FIG. 3B is a schematic view showing a screen demonstrating the provided information and recorded score according to an embodiment of the present disclosure.

Please refer to FIGS. 3A and 3B. Images 31 of the observed entity 5 captured by the camera 2 can be shown on the display unit. In the case the screening conditions derived from the calculation performed by the inference engine 13 are "two years old toddler" and "hunger", an option 32 that asks "what to do when a baby is hungry?" can be shown in the user interface. When the user 6 clicks the option 32, the information providing module 14 provides a list 33 that is obtained after the inference engine 13 has checked the information database 11 and the score database 12, and provides a Confirm option 34 for the user 6 to confirm the list.

Figure 3C:
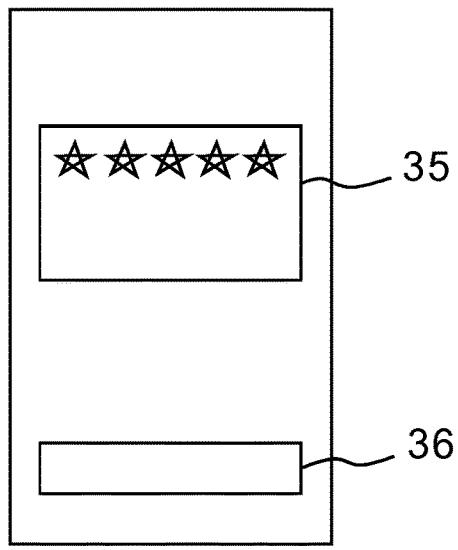
FIG. 3C is a schematic view showing a screen demonstrating the provided information and recorded score according to an embodiment of the present disclosure.

Please refer to FIGS. 2 and 3C. After the user 6 clicks the Confirm option 34, the score recording module 15 performs a step 600, in which a scoring interface 35 is shown on the display unit and the user 6 is asked to input his or her scoring to the selected messages in the list 33 by, for example, giving different number of stars to the selected messages. A Confirm option 36 is shown on the display unit for the user to confirm sending of the scoring. After the user 6 has confirmed the sending of the scoring, the score recording module 15 performs a step 700, in which the scores given by the user 6 to the selected messages are recorded into the score database 12.

Figure 4A:
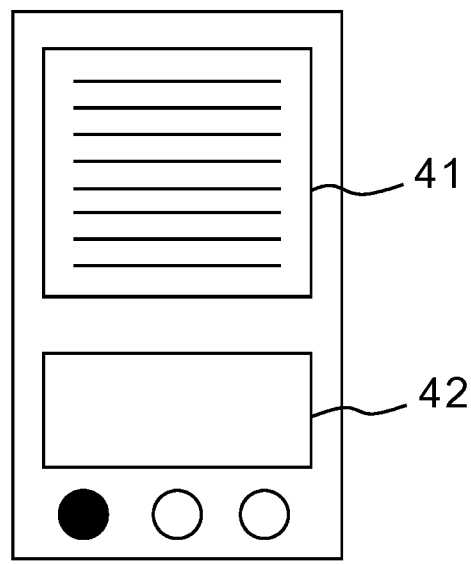
FIG. 4A is a schematic view showing a screen demonstrating the provided information and recorded score according to another embodiment of the present disclosure.
Figure 4B:
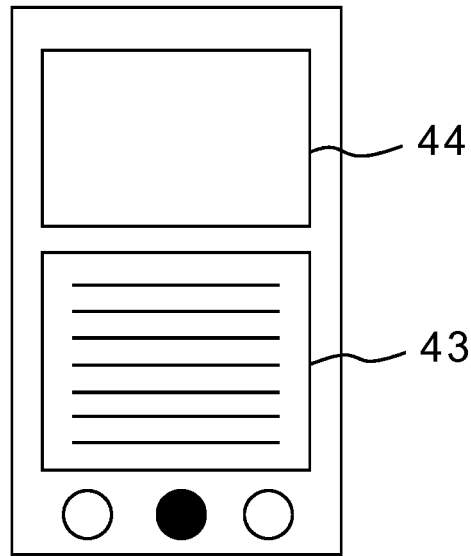
FIG. 4B is a schematic view showing a screen demonstrating the provided information and recorded score according to another embodiment of the present disclosure.
Figure 4C:
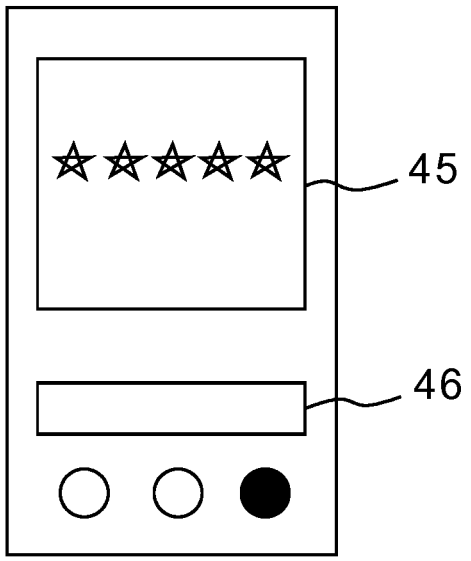
FIG. 4C is a schematic view showing a screen demonstrating the provided information and recorded score according to another embodiment of the present disclosure.

Please refer to FIGS. 4A to 4C. In another example, the inference engine 13 determines the observed entity 5 is four months old according to the birth date of the observed entity 5 and a current time. Then, the inference engine 13 searches the stored message in the information database 11 based on "4-month old", and retrieves selected messages 41 that are related to vaccinations and baby care and have higher scoring according to the scores in the score database 12. A list of the selected messages 41 and pictures 42 related to the selected messages 41 are also displayed on the display unit for the user 6 to review. The user 6 may slide leftward on the screen to go to the next page to view another selected message 43 in the list and pictures 44 related to the selected message 43. The score recording module 15 can display a scoring interface 45 and asks the user 6 to input his or her scoring to the selected messages in the list by, for example, giving different number of stars to the selected messages. A Confirm option 46 is shown on the display unit for the user to confirm sending of the scoring. After the user 6 has confirmed the sending of the scoring, the scores given by the user 6 to the selected messages are recorded into the score database 12 by the score recording module 15.

With the method and system according to the present disclosure, messages are automatically screened according to source data and recorded scores, so that only the messages related to the observed entity are provided to the user, thereby significantly reducing the user's burden in finding useful messages.

While the present disclosure has been described by means of specific embodiments, numerous modifications and variations could be made thereto by those skilled in the art without departing from the scope and spirit of the present disclosure set forth in the claims.

What is claimed is:

1. A system for providing information related to an observed entity to a user, comprising:
    an information database having a plurality of messages stored therein, wherein the messages are related to the observed entity observed by the user;
    a score database for recording a plurality of scores, wherein the scores are corresponding to the messages, respectively;
    an inference engine for retrieving at least one selected message from the messages stored in the information database according to at least one source data and the score database, and generating a list of the at least one selected message, wherein the at least one selected message represents a physiological condition of the observed entity, wherein the list of the at least one selected message contains at least one picture;
    an information providing module for providing an option related to the list of the at least one selected message to the user, and providing the list of the at least one selected message to the user as the option being clicked by the user; and
    a score recording module for receiving a score of the at least one selected messages input to the system by the user, and recording the score into the score database,
    wherein the inference engine retrieves the at least one selected message further according to a weight corresponding to the at least one source data.

2. The system according to claim 1, wherein the source data includes at least one of basic data of the observed entity, recognition results of images of the observed entity, and recognition results of sounds from the observed entity.

3. The system according to claim 1, wherein the source data includes an environmental data.

4. The system according to claim 1, wherein the source data includes a current time.

5. A method for providing information related to an observed entity to a user, comprising the following steps:
    retrieving, according to at least one source data and a score database, at least one selected message from a plurality of messages stored in an information database; and generating a list of the at least one selected message, wherein the messages are related to the observed entity observed by the user, wherein the at least one selected message represents a physiological condition of the observed entity and, wherein the list of the at least one selected message contains at least one picture;
    providing an option related to the list of the at least one selected message to the user;
    providing the list of the at least one selected message to the user as the option being clicked by the user; and
    receiving a score of the at least one selected messages input by the user, and recording the score into the score database,
    wherein the at least one selected message is retrieved further according to a weight corresponding to the at least one source data.

6. The method according to claim 5, wherein the source data includes at least one of basic data of the observed entity, recognition results of images of the observed entity, and recognition results of sounds from the observed entity.

7. The method according to claim 5, wherein the source data includes an environmental data.

8. The method according to claim 5, wherein the source data includes a current time.

9. An electronic device readable non-transient medium having a plurality of program instructions stored therein, and the program instructions being executable by an electronic device to perform the following steps:
    retrieving, according to at least one source data and a score database, at least one selected message from a plurality of messages stored in an information database; and generating a list of the at least one selected message, wherein the stored message is related to an observed entity observed by the user, wherein the list of the at least one selected message contains at least one picture;
    providing an option related to the list of the at least one selected message to the user;
    providing the list of the at least one selected message to the user as the option being clicked by the user, wherein the list of at least one selected message represents a physiological condition of the observed entity; and
    receiving a score of the at least one selected messages input by the user, and recording the score into the score database,
    wherein the at least one selected message is retrieved further according to a weight corresponding to the at least one source data.

10. The electronic device readable non-transient medium according to claim 9, wherein the source data includes at least one of basic data of the observed entity, recognition results of images of the observed entity, and recognition results of sounds from the observed entity.

11. The electronic device readable non-transient medium according to claim 9, wherein the source data includes an environmental data.

12. The electronic device readable non-transient medium according to claim 9, wherein the source data includes a current time.

13. A system for providing information related to an observed entity to a user, comprising:
    a processor; and
    a storage unit having a plurality of program instructions stored therein; and the program instructions being executable by the processor to perform the following steps:
    providing a selected message representing a physiological condition of the observed entity to the user;

generating a list of the at least one selected message, wherein the list of the at least one selected message contains at least one picture;

providing an option related to the selected message to the user;

providing the list of the selected message to the user as the option being clicked by the user;

receiving a score of the selected message input to the system by the user; and recording the score into a score database, wherein the selected message is retrieved, according to at least one source data and the score database, from a plurality of messages stored in an information database; and the messages are related to the observed entity observed by the user, wherein the selected message is retrieved further according to a weight corresponding to the at least one source data.

14. The system according to claim 13, wherein the source data includes at least one of basic data of the observed entity, recognition results of images of the observed entity, and recognition results of sounds from the observed entity.

15. The system according to claim 13, wherein the source data includes an environmental data.

16. The system according to claim 13, wherein the source data includes a current time.

17. An electronic device readable non-transient medium having a plurality of program instructions stored therein, and the program instructions being executable by an electronic device to perform the following steps:

providing a selected message representing a physiological condition of an observed entity to a user;

generating a list of the at least one selected message, wherein the list of the at least one selected message contains at least one picture;

providing an option related to the selected message to the user;

providing the list of the selected message to the user as the option being clicked by the user;

receiving a score of the selected message input to the electronic device by the user; and recording the score into a score database, wherein the selected message is retrieved, according to at least one source data and the score database, from a plurality of messages stored in an information database; and the messages are related to the observed entity observed by the user, wherein the selected message is retrieved further according to a weight corresponding to the at least one source data.

18. The electronic device readable non-transient medium according to claim 17, wherein the source data includes at least one of basic data of the observed entity, recognition results of images of the observed entity, and recognition results of sounds from the observed entity.

19. The electronic device readable non-transient medium according to claim 17, wherein the source data includes an environmental data.

20. The electronic device readable non-transient medium according to claim 17, wherein the source data includes a current time.

21. A system for providing information related to an observed entity to a user, comprising:

an information database having a plurality of messages stored therein, wherein the messages are related to the observed entity observed by the user;

a score database for recording a plurality of scores, wherein the scores are corresponding to the messages, respectively;

an inference engine for performing a weighted calculation on at least two source data; retrieving at least one selected message from the messages stored in the information database according to the weighted calculation and the score database, and generating a list of the at least one selected message, wherein the at least two source data are selected from the age of the observed entity and at least one of current time, an image of the observed entity, a recognition result of a sound from the observed entity, and the distributed areas and peak probability of a currently spreading disease, and the at least one selected message represents a physiological condition of the observed entity; and an information providing module for providing the at least one selected message to the user according to the list, wherein the selected message is retrieved further according to a weight corresponding to the at least one source data.

* * * * *